United States Patent

Aarnes

[11] Patent Number: 5,322,261
[45] Date of Patent: Jun. 21, 1994

[54] ARRANGEMENT IN CLOSING VALVES

[76] Inventor: Råg Aarnes, Hjaltlandsgt. 12, 4009 Stavanger, Norway

[21] Appl. No.: 952,709
[22] PCT Filed: May 15, 1991
[86] PCT No.: PCT/NO91/00070
 § 371 Date: Nov. 12, 1992
 § 102(e) Date: Nov. 12, 1992
[87] PCT Pub. No.: WO91/18229
 PCT Pub. Date: Nov. 28, 1991

[30] Foreign Application Priority Data

May 16, 1990 [NO] Norway ................. 902182

[51] Int. Cl.⁵ ............................. F16K 15/20
[52] U.S. Cl. ......................... 251/159; 251/161
[58] Field of Search ............. 251/159, 161, 172, 174

[56] References Cited

U.S. PATENT DOCUMENTS

| 3,504,885 | 4/1970 | Hulsey . | |
|---|---|---|---|
| 3,565,392 | 2/1971 | Bryant | 251/159 |
| 3,883,112 | 5/1975 | Milleville et al. . | |
| 3,912,220 | 10/1975 | Vasicek | 251/159 |
| 3,960,363 | 6/1976 | Domyan | 251/174 |
| 4,137,936 | 2/1979 | Sekimoto et al. | 251/174 X |
| 4,280,522 | 7/1981 | Pechnyo et al. | 251/174 X |
| 4,718,444 | 1/1988 | Boelte | 251/159 X |

FOREIGN PATENT DOCUMENTS

| 161056 | 11/1985 | European Pat. Off. . |
| 3819300 | 12/1989 | Fed. Rep. of Germany . |
| 157514 | 12/1987 | Norway . |
| 2073855 | 10/1981 | United Kingdom . |

Primary Examiner—Stephen M. Hepperle
Attorney, Agent, or Firm—Andrus, Sceales, Starke & Sawall

[57] ABSTRACT

A shutoff or closing valve, especially a ball valve, comprises a valve body (2) having at least one annular sealing surface formed for sealing engagement against a seal (5) carried by an axially displaceably supported seat ring (3). The seat ring (3) or each such seat ring, respectively, is adapted to be urged toward the sealing position, wherein its seal (5) cooperates and contacts the valve body (2), through the intermediary of spring force (4) and/or fluid pressure (via 6). In order to improve the sealing function and enable the accommodation of leakaqes between the valve body (2) and said seat(s) (3), the seat ring or each such seat ring, respectively, is assigned at least one additional separate seat ring (11) axially displaceably supported independently on the first-mentioned seat ring (3). The additional separate seat ring (11) may be arranged concentrically with, surround as well as rest displaceably against the first-mentioned seat ring (3).

13 Claims, 2 Drawing Sheets

ARRANGEMENT IN CLOSING VALVES

The invention relates to an arrangement in shutoff or closing valves, particularly ball valves, comprising a preferably valve-ball-shaped, movable, preferably rotary valve body adapted to cooperate sealingly with at least one axially displaceable seat ring, possibly through the intermediary of a seal, wherein the seat ring or each seat ring, respectively, is urged toward the sealing position through spring force and/or fluid pressure and/or some other influence of force.

The valve body in such closing valves with which the invention is concerned, has at least one annular sealing surface against which said seat ring(s) is(are) intended to be urged into sealing engagement. The seat ring or each seat ring, respectively, carries usually a seal ring with which it cooperates with the valve body, but there are also so called metal-to-metal seals lacking a soft seal. The present invention is equally usable in both cases.

A valve ball of a shutoff valve of this general kind will, usually, have a design substantially corresponding to a ball wherein two diametrally opposite spherical segments are cut off, and wherein the valve ball is formed with a central through-going bore having a diameter substantially corresponding to that of the "cut-off" spherical segments.

However, the invention may also be used in connection with differently shaped valve bodies, for example conical, tapered, cylindrical, barrel-shaped, double conical, etc.

According to one aspect, the invention aims generally at improving the seal in closing valves of the kind in question and/or enable that possible leaks relatively rapidly may be brought to an end.

In accordance with another aspect, the invention aims at realizing activation/deactivation of the seal according to need. A possibility of activating/deactivating the (primary) seat may be desirable or necessary in shutoff valves unable to be opened under the influence of a sufficiently high differential pressure, due to the risk of damaging/destroying the seal (such a situation exists i.a. in valves using soft seals, e.g. of the so called PTFE type). Prior art technique aims at solving this problem through "bypass" around the valve in order to equalize the pressure prior to the opening of the valve. This known solution involves relatively high costs and, moreover, represents a safety risk.

Leaking closing valves may represent substantial problems. Often, leakage between seat and valve body requires damage repairs involving stoppage, in extreme cases causing accidents. Within the valve industry, one has tried to improve the sealing devices. The new sealing devices developed and tried out, are partly of complicated construction as well as being expensive to manufacture. Furthermore, they are complicated to operate and require a comprehensive maintenance. Many recently developed sealing devices for closing valves have not yet been tried out and operated in practice, and to these many unforeseen problems might be attached, with regard to operation, both at short and long term.

Taking as one's starting-point the above-mentioned objects, one has, in accordance with the present invention, aimed at providing a sealing arrangement in shutoff or closing valves of the introductorily defined kind, wherein the conditions are arranged for the purpose of maintaining optimal functional reliability while retaining improved sealing conditions as well as enabling stopping of possible leakage in situ, so that stoppage due to leak problems may be postponed and planned.

In accordance with the invention, one has likewise aimed at providing possibilities for the deactivation/activation of one or more seats included in the valve structure, the deactivation/activation possibilities preferably existing at each single seat, independent on the other seat/seats.

According to the invention, said objects are realized through the features comprised by the following claims.

The ordinary axially displaceable seat ring or each axially displaceable seat ring, respectively, is, in accordance with the invention, assigned at least one further, independently axially displaceable seat ring. If one chooses that terminology of denoting the ordinary seat ring or rings the primary seat or the primary seats, respectively, it comes natural to denote the further seat ring according to the invention the secondary seat or the secondary seats, respectively. Thus, this or these secondary seat rings are axially displaceable in relation to the primary seat ring or the associated (adjacent) primary seat ring. Each primary seat may as a principle be assigned more than one secondary seat, yet one secondary seat is in most cases of application sufficient in order to improve the sealing function or in order to stop a leakage between valve body and seat rapidly.

As the secondary seat is axially displaceable independently on the adjacent primary seat, the secondary seat may be kept in a non-operative state of readiness position (deactivated) or it may be activated in order to be used in combination with the primary seat, which may be assigned an activating/deactivating device of its own. Then, the primary seat may have a metal-to metal seal, while the secondary seat may be provided with e.g. a PTFE-seal. This prevents blow-out or damage on the seat.

With the invention, one avoids problems due to ageing of vital parts; especially the secondary seat will benefit of this advantage as it, according to preferred embodiments, will be located protectively inwardly of the primary seat. Further, flow of material within sealing surfaces will be avoided. This is caused through lacking contact/tensions prior to the activation of the secondary seat and/or the primary seat. The sealing faces of the seats are not subjected to wearing before activation. This avoids adhesion between valve body and seat seal. Local flow (deformation) within the material of the valve body is avoided. These advantages will present themselves with increasing force as the valve life increases.

With activated secondary seat, a double seal is achieved as compared with conventional valves. With double seal, two independent seats are obtained, and blockage of one of them does not prevent the other from functioning.

According to the invention, one may, if desired, increase the sealing pressure on the secondary seat, and possibly on the primary seat, by means of an external pressure source, or one may open a channel for the application of internal fluid pressure, in order to urge the secondary seat ring axially toward sealing position. The secondary seat may, alternatively or additionally to fluid pressure influence, be assigned a pressure spring, in the same manner as the primary seat.

The secondary seat ring may cooperate with an easily releasable locking mechanism, which may have the form of a deactivating/activating device adapted to move and keep the secondary seat ring in inoperative position of readiness (against the action of the above-mentioned pressure spring). The primary seat ring may have a corresponding, possibly identical deactivating-/activating device, e.g. in the form of an eccentric device, the cam action thereof being in accordance with the displacement directions of the respective seat ring. One embodiment of said locking mechanism and its release device distinguishes itself through simple constructive design.

In closing valves formed in accordance with the present invention, there is no need for special tools during production, as a production line common to most ball valve producers may readily be adapted.

Shutoff valves formed in accordance with the invention, will have a very wide field of applications. The chemical industry as well as the oil and gas industries constitute non-restricting examples of the possible industrial utilization of the invention.

It has been mentioned previously that the invention enables a postponement and planning of stoppage caused by leakage in a valve. In the case of a leakage, the secondary seat is activated, so that a reliable barrier is established until a repair of the primary seat, possibly an exchange of the valve, can take place.

The valve according to the invention does not need to be operated periodically in order to retain its functional properties. This is of particularly great importance in subsea closing valves in oil and gas pipelines which are adapted to become operative at a time far into the future.

As mentioned, the seat will not be subjected to wearing prior to it becoming activated, this being the case both when the valve occupies open or closed position thereof. Wearing on the secondary seat subsequent to activation becomes less than on the primary seat, because the primary seat shuts out foreign matter and impurities as well as isolates the secondary seat from corrosive components, cavitation, etc. Conservation liquid might possibly be used. In case the secondary seat is not activated before the useful life of the primary seat has expired, this representing approximately 100% increase in the functional life of the valve.

In closing valves formed in accordance with the invention, the possibilities of integrating lubricating and flushing systems for the primary as well as the secondary seat are simplified.

A non-limiting example of a preferred embodiment of the invention is further explained in the following, reference being made to the accompanying drawings, wherein.

Figure 2:
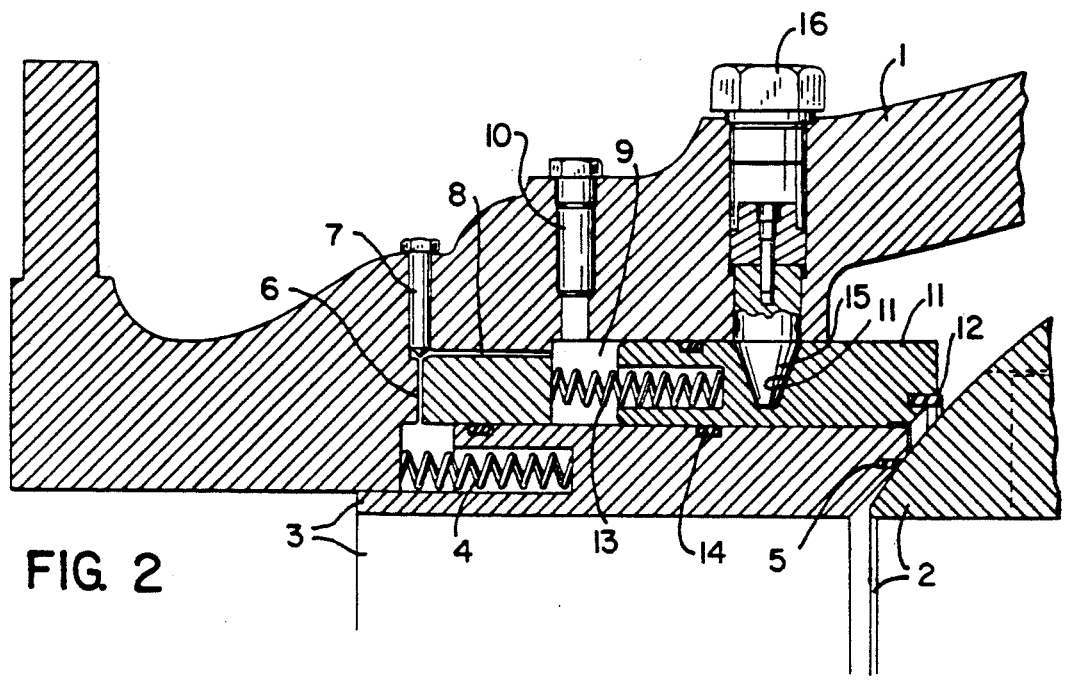
FIG. 2 shows, on a larger scale, a detailed partial view from FIG. 1.
Figure 3:
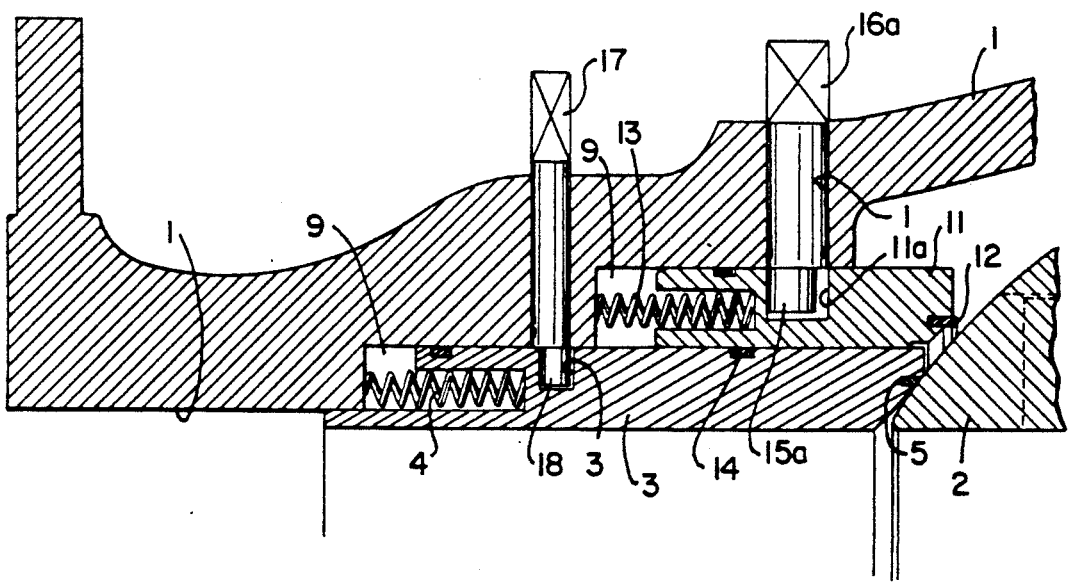

FIG. 3 corresponds to FIG. 2, but shows a second embodiment of a deactivating/activating device assigned to each seat ring.

For the two different embodiments shown in FIGS. 1 and 2 and in FIG. 3, respectively, identical reference numerals have been used for identical members/parts and, in connection with FIG. 3, only the respective deactivating/activating devices will be described.

Figure 1:
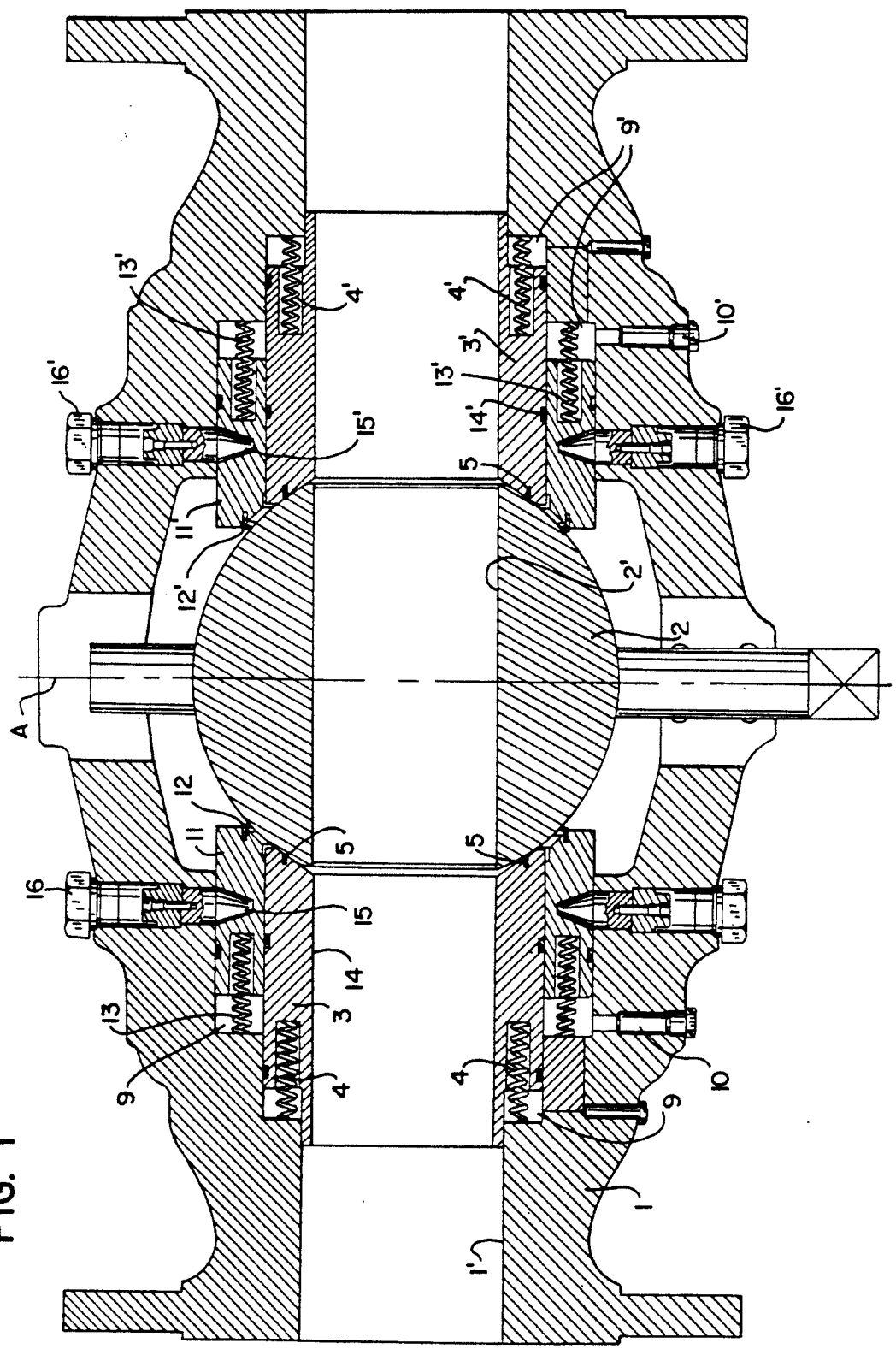
FIG. 1 shows an axial section through a ball valve according to a first embodiment in an open position, wherein two secondary seat rings are retained in inoperative positions of readiness by means of releasable locking mechanisms.

First, reference is made to FIGS. 1 and 2.

The reference numeral 1 denotes the valve housing, while 2 indicates the valve ball which is formed with a throughgoing bore 2'. The passage of the valve housing is denoted 1'.

As is well known, the valve ball 2 may be rotated about an axis A for effecting the closure of the passage 1'. The support structure for the valve ball 2 belongs also to prior art technology and will, therefore, not be further described here.

The valve ball 2 has been assigned two annular seats 3,3'—in the following designated primary seats or primary seat rings, respectively—which are axially displaceably supported within the housing 1 and of which each is assigned a set of pressure springs 4 and 4', respectively, tending to urge the associated primary seat ring 3 or 3', respectively, toward the sealing position wherein they rest against the valve ball 2 through the intermediary of an annular seal 5, 5' each. Instead of the springs 4,4' or in addition thereto, the primary seat rings 3,3' may be subjected to the influence of axial pressure in the direction of the seal 5,5' by means of internal fluid pressure which, via a channel branch 6, may be brought to act against one gable face of the seat rings 3,3' at the opposite end of the seal 5,5'. The channel branch 6 may he closed by means of a screw-shaped closure means 7 adapted to act at the connection or transition zone between the channel branch 6 and a second channel branch 8, extending perpendicularly to the longitudinal direction of the former and debouching within an annulus 9,9' formed into the valve housing 1, and wherein also a closable supply tube 10,10' for external pressure opens out.

In accordance with the invention, axially inwardly of each of the two said annular chambers 9,9', a secondary seat ring 11,11' has been arranged, concentrically with the adjacent primary seat ring 3,3' and independently axially displaceable thereto as well as provided with a seal ring 12,12' for sealing cooperation with the valve ball 2. Each secondary seat 11,11' is assigned a set of pressure springs 13,13' in the same way as with the primary seats 3,3'.

In the embodiment shown, adjacent seat rings 3,11 and 3',11' rest relatively axially displaceably against each other through the intermediary of an annular seal 14,14' countersunk within a groove in the primary seat. However, the mutual arrangement of adjacent seat rings might be carried into effect in many other ways, provided that the secondary seat ring 11,11' is capable of being displaced axially in relation to the adjacent primary seat ring 3,3', so that the primary and secondary seat rings are displaceable independently of each other and, thus, also in relation to valve housing 1 and ball 2.

As said annular chambers 9,9' each is connected to supply means for internal as well as external fluid pressure, the secondary seat rings 11,11' may be subjected to said pressure in addition to the spring pressure (the spring sets 13,13').

According to the embodiment shown in FIGS. 1 and 2, each secondary seat ring 11,11' is assigned an easily releasable locking mechanism adapted to retain the secondary seat rings in a non-active position of readiness (deactivated), such as shown in FIGS. 1 and 2, i.e. withdrawn in relation to the valve ball, so that the associated seals 12,12' are spaced from the ball surface. An alternative embodiment of the deactivating/activating device will be later described with reference to FIG. 3, wherein the primary seat as well is assigned an independent deactivating/activating device of its own.

The releasable locking mechanisms of FIGS. 1 and 2 are only indicated diagrammatically. However, they may e.g. consist of spring-loaded pins. Each such pin may have a conical head portion 15 with which it may be brought to engage withdrawably into a correspondingly shaped cavity 11" in the secondary seat ring 11, FIG. 2. Said pin, a piston or a similar means may be operated from an external nut 16, 16'. Such locking mechanisms 15,16 would be distributed equidistantly around the circumference of each secondary seat ring 11,11'.

With one or more secondary seats movable independently of the adjacent primary seat, one may, within the valve, establish a double barrier against leakage between valve body and seat. In the active as well as in the inactive position of the secondary seat, the primary seat 3,3' will protect the former from the influences of foreign matter capable of effecting wear and tear.

If a shutoff or closing valve of this general type is to be used over relatively extended periods of time, it is suitable to lock the secondary seats 11,11' by means of the locking mechanisms 15,16;15',16'. This is important in order to avoid flow within the materials of the seat seal, seat and ball in the long term. One does not have to turn the valve body, e.g. once a year, in order to keep the valve in order. In subsea valves such a periodical valve operation is very expensive. If it, for some reason or another, is desired to have a very high sealing pressure within the seat, it is, according to the invention, via 10, possible to supply additional pressure from an external hydraulic source instead of or in addition to the conventional principle consisting in utilizing the internal pressure within the medium (via 7-8) and/or the pressure force achieved by means of the springs 4,4',13,13'.

Whenever the secondary seat rings 11,11' are to be activated, the pin or piston head portions 15 are withdrawn from the cooperating cavities 11" of the seat rings 11,11', FIG. 2, whereby the springs 13,13' and/or internal medium pressure (via the channel branch 8) and/or external fluid pressure (via the supply tube 10) provide for urging the seals 12,12' into sealing engagement against the valve ball 2.

In the embodiment of FIG. 3, the active part of the deactivating/activating means 16a in the form of an eccentric roller 15a engages into a secondary seat cavity 11a' concentric with the shaft portion of the means 16a. In the situation illustrated, the eccentric roller 15a has indeed effected an axial withdrawal of the secondary seat 11 from the ball 2 and deactivation thereof (of its seal 12), retaining the secondary seat 11 in this deactivated position. Rotation of the shaft portion of the means 16a within its assigned coaxial bore 1" in the valve housing 1 in relation to the eccentric roller position shown, the deactivating action of the latter will be nullified, whereafter the spring 13 will activate the secondary seat 11.

In FIG. 3, the primary seat 3 (or each primary seat 3,3' according to FIG. 1) is assigned a corresponding deactivating/activating means 17 having an eccentric roller 18 engaging into a cavity 3" in the primary seat 3. This deactivating/activating means 17,18 works in exactly the same way as the means 16a, 15a for the secondary seat 11.

Thus, according to the invention, there has been provided a novel shutoff or closing valve in the form of a ball valve which, in addition to the necessary primary seat(s), comprises one or more secondary seats independently activable/deactivable in relation to the primary seat/seats which, likewise, may be individually activable/deactivable. Similarly, it represents new technology to be capable of deactivating/activating valve seats of the kind in question and to use externally supplied fluid pressure in order to increase the seat pressure.

I claim:

1. A shutoff valve comprising:

a valve housing having an inlet and an outlet;

a valve body within said valve housing, said valve body having a bore extending therethrough, said valve body and being movable between an open position in which fluid may flow between said inlet and outlet through said bore and a closed position in which such fluid flow is blocked, said valve body having at least one annular sealing surface thereon, said sealing surface being formed from a portion of a spherical surface of said body;

a main valve seat ring adapted to cooperate with said annular sealing surface of said valve body, said main valve seat ring being mounted in said valve housing for being displaceable along the axis of said ring toward said valve body, said main valve seat ring being displaceable along the axis of said ring away from said valve body;

means for urging said main valve seat ring toward said valve body and into sealing engagement with said sealing surface to seal said valve body in said valve housing;

at least one additional valve seat ring adapted to cooperate with said annular sealing surface of said valve body, said additional valve seat ring being mounted in said valve housing for being displaceable along the axis of said ring toward said valve body, said additional valve seat ring being displaceable along the axis of said ring away from said valve body;

means for urging said additional valve seat ring toward said valve body and into sealing engagement with said annular sealing surface to form a seal between said valve body and said additional valve seat ring;

each one of said valve seat rings being displaceable toward and away from said valve body independently of the other one of said valve seat rings; and locking means for selectively locking said additional valve seat ring out of sealing engagement with said valve body.

2. A shutoff valve as set forth in claim 1 wherein said locking means is further defined as comprising mechanical means and as comprising means for displacing said additional valve seat ring away from said valve body.

3. The shutoff valve according to claim 1 further including another locking means for displacing said main valve seat ring away from said valve body and for selectively locking said main valve seat ring out of sealing engagement with said valve body.

4. The shutoff valve according to claim 2 further including another locking means for displacing said main valve seat ring away from said valve body and for selectively locking said main valve seat ring out of sealing engagement with said valve body.

5. A shutoff valve according to claim 2 wherein said locking means for said additional valve seat ring comprises a bolt supported in said valve housing, the axis of said bolt extending perpendicularly to the axis of said additional valve seat ring, said bolt having an actuation head engaging a cavity formed in said additional valve seat ring.

6. A shutoff valve according to claim 3 wherein said locking means for said main valve seat ring comprises a bolt supported in said valve housing, the axis of said bolt extending perpendicularly to the axis of said additional valve seat ring, said bolt having an actuation head engaging a cavity formed in said main valve seat ring.

7. A shutoff valve according to claim 5 wherein said actuation head is conically tapered toward a free end thereof.

8. A shutoff valve according to claim 6 wherein said actuation head is conically tapered toward a free end thereof.

9. A shutoff valve as set forth in claim 5 wherein said bolt is rotatably supported within said valve housing and wherein said actuation head comprises an eccentric roller on said bolt.

10. A shutoff valve as set forth in claim 6 wherein said bolt is rotatably supported within said valve housing and wherein said actuation head comprises an eccentric roller on said bolt.

11. A shutoff valve as set forth in claim 1 wherein said means for urging said additional valve seat ring toward said valve body comprises means for applying hydraulic fluid pressure to said additional valve seat ring.

12. A shutoff valve as set forth in claim 1 wherein said additional valve seat ring is mounted in said valve body concentrically with said main valve seat ring and to surround said main valve seat ring, said additional valve seat ring resting displaceably on said main valve seat ring.

13. A shutoff valve as set forth in claim 12 further including at least one seal disposed between said additional valve seat ring and said main valve seat ring.

* * * * *

UNITED STATES PATENT AND TRADEMARK OFFICE
CERTIFICATE OF CORRECTION

PATENT NO. : 5,322,261
DATED : June 21, 1994
INVENTOR(S) : Aarnes

It is certified that error appears in the above-indentified patent and that said Letters Patent is hereby corrected as shown below:

CLAIM 6, col. 7, line 8, delete "additional" and substitute therefor ---main---

Signed and Sealed this

Sixth Day of December, 1994

Attest:

BRUCE LEHMAN

*Attesting Officer*          *Commissioner of Patents and Trademarks*